United States Patent

Lee et al.

[11] Patent Number: 5,821,875
[45] Date of Patent: Oct. 13, 1998

[54] DATA SWITCHING DEVICE

[75] Inventors: Hyeun Tae Lee; Seog Ki Lee; Young Hee Lee, all of Daejeon, Rep. of Korea

[73] Assignees: Electronics And Telecommunications Research Institute, Daejeon; Korea Telecommunication Authority, Seoul, both of Rep. of Korea

[21] Appl. No.: 578,287

[22] Filed: Dec. 26, 1995

[30] Foreign Application Priority Data

Dec. 23, 1994 [KR] Rep. of Korea ................... 1994 36973

[51] Int. Cl.⁶ ........................................................ H04Q 1/00
[52] U.S. Cl. ................................. 340/825.79; 340/825.8; 340/826; 340/827; 370/241; 370/352; 370/360; 379/279
[58] Field of Search ......................... 340/825.8, 825.79, 340/826, 827; 370/352, 359, 360, 386, 388, 228, 241; 379/271, 272, 273, 291, 292, 279

[56] References Cited

U.S. PATENT DOCUMENTS 3,814,859  6/1974  Vrba et al. ............................ 379/279
4,814,762  3/1989  Franaszeck ......................... 340/825.79
4,821,034  4/1989  Anderson et al. .................... 340/825.8

OTHER PUBLICATIONS

"Fiber Channel (FCS)/ATM interworking: A design solution", A. Analoni, M. De Sanctis, F. Avaltroni, G. Rulli L. Proietti G. Lombardi, M. Ericssion Fatme R&D Division, Rome, I, 1993 IEEE. no month.

"High–Performance Switching with Fibre Channel", Terry M. Anderson and Robert S. Cornelius, Ancor Communications, Inc., 1992 IEEE. No month.

*Primary Examiner*—Michael Horabik
*Assistant Examiner*—Yonel Beaulieu
*Attorney, Agent, or Firm*—Jacobson, Price, Holman & Stern, PLLC

[57] ABSTRACT

A data switching device which implement the data exchange between a plurality of terminals connected to the communication network. Even if the circuit connection exists in the relevant input port and the destination port, since the frame is transmitted to the output part through the dual circuit switch path, the intermix mode service is processed in the output and then the effective intermix mode service can be processed. Also, since the same circuit switch is dually used, the high reliability regarding to the switch failure can be obtained.

8 Claims, 8 Drawing Sheets

DATA SWITCHING DEVICE

FIELD OF THE INVENTION

The present invention relates to a data switching device, and more specifically, to a data switching device between a plurality of terminals connected to each other in a communication network.

BACKGROUND OF THE INVENTION

A communication system which can transfer various types of information traffic (for example, voice, video, graphic, text, and computer data, etc.), has been required. In this information traffic, the voice and video are widely classified as the real time traffic, and the computer data is widely classified as the non-real time traffic.

The real time traffic is a relatively constant traffic load to the communication system. In the real time traffic, the transmission error or. transmission losses are allowed to some degree. In the communication system, the real time information is transmitted to the target position in the required transmission delay range. On the other hand, the non-real time traffic is a traffic load which is subject to heavy fluctuations. In addition, the non-real time traffic is subjected to the influence of the transmission loss and transmission error, but is not prone to the influence of the transmission delay and delay fluctuations.

In accordance with this traffic characteristic, two switching exchange methods have been developed. One of these methods is a circuit switching method, which is suitable for the real time traffic, and the other is a packet exchange method, which is suitable for the multiplex non-real time data.

Recently, a switching method has been developed in order to efficiently process all the real time and the non-real time traffic. This switching method processes both of the real and the non-real time traffic by using a virtual circuit and a small fixed sized packet. In this method, since the transmission information is processed by a small fixed sized packet, a bandwidth can be efficiently distributed in a multiplex channel. Also, by using a virtual circuit, the multi-connection management is efficient. An example of this switching method is the asynchronous transfer mode(ATM).

However, in the multi-computer environment and in a inter-connections between the high performance I/O device and the super computer, it is capable of using communication system that has little delay and the ultrahigh speed bandwidth of the Gbps class is needed. In the ultrahigh speed communication system, the data switching method, which exchanges the data by the small units, cannot exchange the packet over the Gbps class because there are many headers to be processed. The low speed communication system has some problems as follows: the serialization problem in which the transmission delay in a subsequent short packet is increased by the output blocking of the previous long packet, and a problem in which the real time processing per unit is difficult in the multiplex output. These problems can be overcome in the ultrahigh speed communication system over the 1 Gbps class by its small-transmission latency. Therefore, in recent communication over the Gbps class, the packet whose maximum length is very long and whose length is variable, can be used. For example, FCS(Fibre Channel Standard), which is standardized to the communication method of the ANSI(Amefican National Standards Institute), is encountered as a good candidate of a gigabit communication technology. This communication method fundamentally provides the circuit mode service which allocates to the entire bandwidth to the channels between the communication terminals. This communication method provides services in order to satisfy the various communication requirement as follows:

First, if the communication terminals are connected to one another in accordance with the connection procedure, the circuit mode service maintains the connection until the one of the communicating terminals requests the termination. The connection between two communication terminals is achieved either by connection of the link to point-by-point or by the switching device which exchanges the data. In this communication service, the entire bandwidth of the link is allocated between the interconnected two communication terminals.

Second, the frame mode service for the non-real time traffic can transmit the data frames where each frame has a different target position to the destination terminal by frames. Here, the frame contains the start and destination address data as unit information for routing.

And, in case of circuit mode service, the data frame is not continuously transmitted between two connected communication terminals. Therefore, by using the interval which does not transmit these data frames, connectionless type frame is transmitted (this service type is called the intermix mode service).

Figure 1:
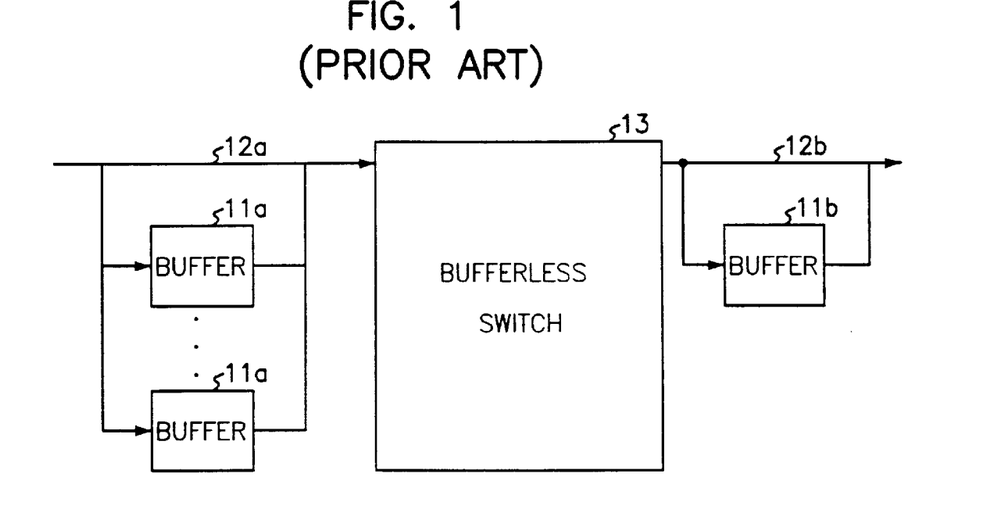
FIG. 1 is a block diagram of one embodiment of a conventional data switching device.

FIG. 1 shows a block diagram showing one of the conventional data switching devices, which includes a single circuit switch 13 and I/O buffers 11a and 11b. The circuit switch 13, which does not have a internal buffer, supports the circuit mode service together with the frame mode service.

In case of the circuit mode service, the data is not transmitted through the I/O buffers 11a and 11b, but through the directive paths 12a and 12b. In the above mentioned structure, even if the circuit switch 13 internally has non-blocking characteristics, the output blocking problem of the packet toward the identical output part still exists. In order to solve this problem, the input buffer 11a is connected to the switch input terminal. When there is one input buffer, the maximum throughput is limited to 58% because of a blocking in the previous packet which is caused by output blocking about the destination port of the previous packet, i.e., the HOL(head of line) blocking. However, in case that the input buffer 11a consists of the multi-buffer, the switching performance can be increased as if the output buffer method which has the concurrent path between the input and output ports.

Since this structure needs the switching control function for intermediating the connectionless packets which is waiting in the different input queue, such that the performance is influenced by capability or the processing method of the switch control function. Specially, since the state of the entire traffic must be monitored by the switch control function in order to implement the intermix mode service, there is a problem in that the load of the switch control is larger.

Figure 2:
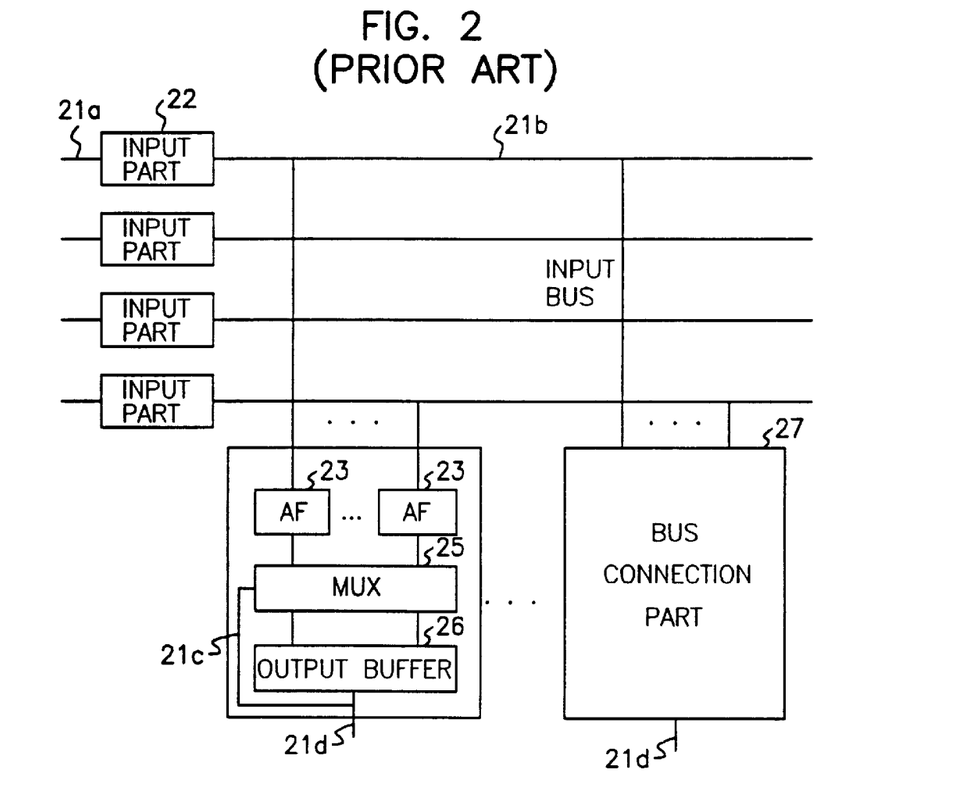
FIG. 2 is a block diagram of another embodiment of a conventional data switching device.

FIG. 2 shows a block diagram of another embodiment of the conventional data switching device includes the output buffer type data switching device having the path which can be simultaneously all connected between the input and the output.

This switching device has an output buffer 26 by each path and a simultaneous path 21b between the input port 21a and output port 21d. Input packet does not pass through the buffer for circuit mode service in the bus connection part 27 which is connected to the input bus 21b, but output to the output terminal 21d through the directive connection path 21c based on the choice of the output selector(MUX; 25).

The benefit of this structure is that it prevents the low performance caused by the HOL blocking effect. However, there is problem that in this embodiment the output structure is complex and the cost is expensive.

Figure 3:
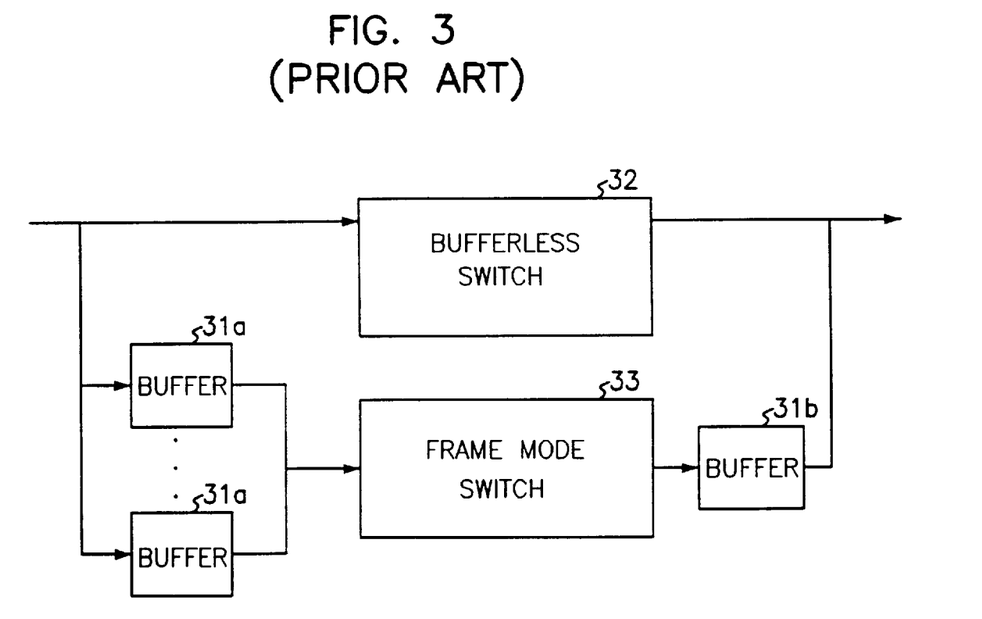
FIG. 3 is a block diagram of another embodiment of a conventional data switching device.

FIG. 3 shows a block diagram of another embodiment of the conventional data switching device whose structure has an additional switch path for the frame mode traffic in the bufferless circuit switch.

This structure includes both of a frame mode switch 33 only for the frame mode traffic and the bufferless circuit switch 32 only for the circuit switching function. The structure can easily support the intermix mode service, and the various types of the switches can be used to implement the frame mode switch 33.

However, since each switch has different characteristics, if failure occurred in the one side of the switch path, the complete service for the frame mode service and the circuit mode service is difficult to be performed only by the other switch. It has a low reliablity.

SUMMARY OF THE INVENTION

Therefore, it is an object of the invention to provide a data switching device whose hardware costs relatively low, providing the high performance and reliability, and being able to process the circuit mode service and the frame mode service.

For achieving the above object, the data switching device for connecting between a plurality of the communication terminals includes a switch part comprising two identical bufferless circuit switches; a switch controller which control the circuit switch; an input part comprising a directive data input path having no buffer which transmits the circuit mode data received from the outside; a two parallel input buffer storing the frame mode service data received from the outside: an input selector which selects the connection between the input of the two bufferless circuit switch and the output of the two input buffers; an input controller which controls the operation of the input selector and the input buffer; an output part including a directive data output path having no buffer which transmits the circuit mode frame, the output of the switch part, to the out part; two parallel output buffers which store the frame of the frame mode, the output of the switch part; an output selector which selects the connection between two output buffers and the circuit mode output path, and the output of the bufferless circuit switch; and an output controller which controls the operation of the output selector and the output buffer.

BRIEF DESCRIPTION OF THE DRAWINGS

The above object and other advantages of the present invention will become more apparent by describing in detail the preferred embodiment of the present invention with reference to the attached drawings, in which.

DETAILED DESCRIPTION OF THE PREFERRED EMBODIMENTS

A data switching device in the asynchronous transfer mode(ATM) processes according to hybrid multiplexing the characteristics of the circuit switching and that of packet switching by the short fixed length packet ofthe 53 octet. However, the data switching device in accordance with the present invention supports the circuit mode and the frame mode service by using the packet which has a variable length and has a long maximum length, and supports the intermix mode for transmitting the connectionless type frame in course of the circuit mode service.

The FCS (Fibre Channel Standard) is a protocol having the above mentioned characteristics. In order to overcome the problems of the SCSI(Small Computer System Interface) or HIPPI(High Performance Parallel Interface), the limitations the distance, delay, addressing and multiplexing, the FCS protocol is standardized in the United state ANSI. It provides more than 1 Gbps rate of the transmission speed and expands to the 10 km of the transmission length, maximumly. Also, FCS protocol can support the conventional various channel (for example, SCSI, HIPPI, etc.), as well as the conventional LAN protocol and the internet protocol.

In the FCS protocol, in order to support the various types of the traffic, the following service classes are defined and supported.

Class 1 service: it is a circuit mode service where the circuit is established in accordance with the connection request between the communication terminals, then the full bandwidth is allocated by the point-to-point.

Class 2 service: it is a connectionless frame mode service having the notification of delivery regarding the transmission result between the communication terminals. This service can male one communication terminal transmit the continuous frame to the several destination terminals in without the connection establishment between the communication terminals, and the frames can be transmitted from a plurality of the communication terminals to one of the communication terminals. In this case, the data switching device performs the routing function of the frame.

Class 3 service: it is similar to the class 2 service in that it is a connectionless type of the frame mode service, but no acknoweldgement of receipt is given.

Intermix mode service: it is an optional service for the class 1 service, during the connection of the class 1 service, this service provides the connectionless type service as the class 2 and class 3. That is, the connectionless type service is performed by using the non-used band width.

Figure 4:
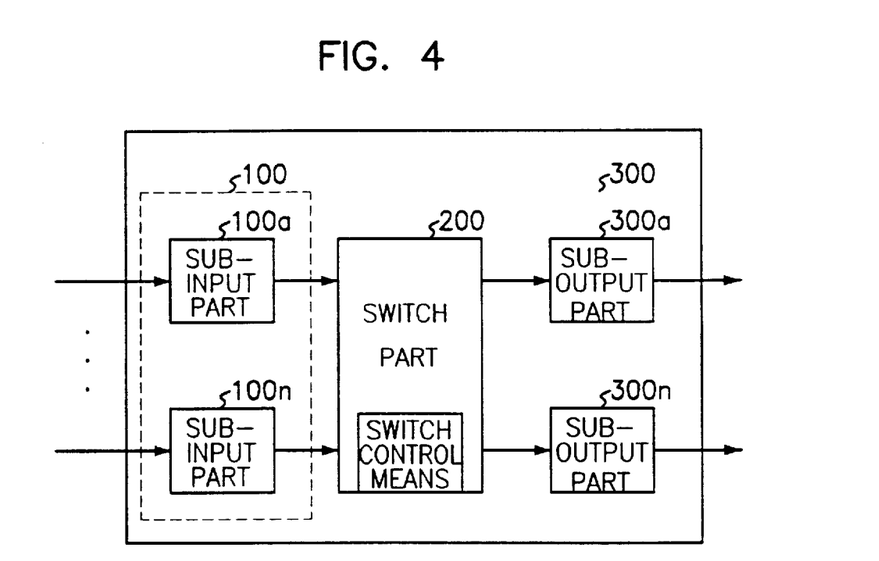
FIG. 4 is a block diagram of the data switching device in accordance with the present invention.

FIG. 4 is a block diagram of the data switching device in accordance with the present invention, which comprises an input part 100, an output part 300 and a switch part 200.

The frame which is inputted to the data switching device, is transmitted to the output 300 through the input part 100 and switch part 200. In order to prevent the collision in the output part and the path collision in the switch part 200, the buffer should be mounted on the input part 100, output part 300 or switch part 200.

The switch part 200 can be composed of the multi-staged interconnection network which is composed of the one or more of unitary switch to expansion of the port numbers, thereby constituting the large scaled switch. The frame which is input to the input part 100 through the transmission link, have a header comprising the frame control information such as data and error detection bits. The frame control information includes the routing information having the destination address and the sequence number of the packet. Also, frame transmission mechanism must have a frame discriminator which exists on the frame boundaries. The FCS protocol has encoded special codes which represent to start and the end of the frame. These special characters also represent the service class and the kinds of the packets. The adapted process is performed in the input part 100, in accordance with kinds of the frames.

Figure 5:
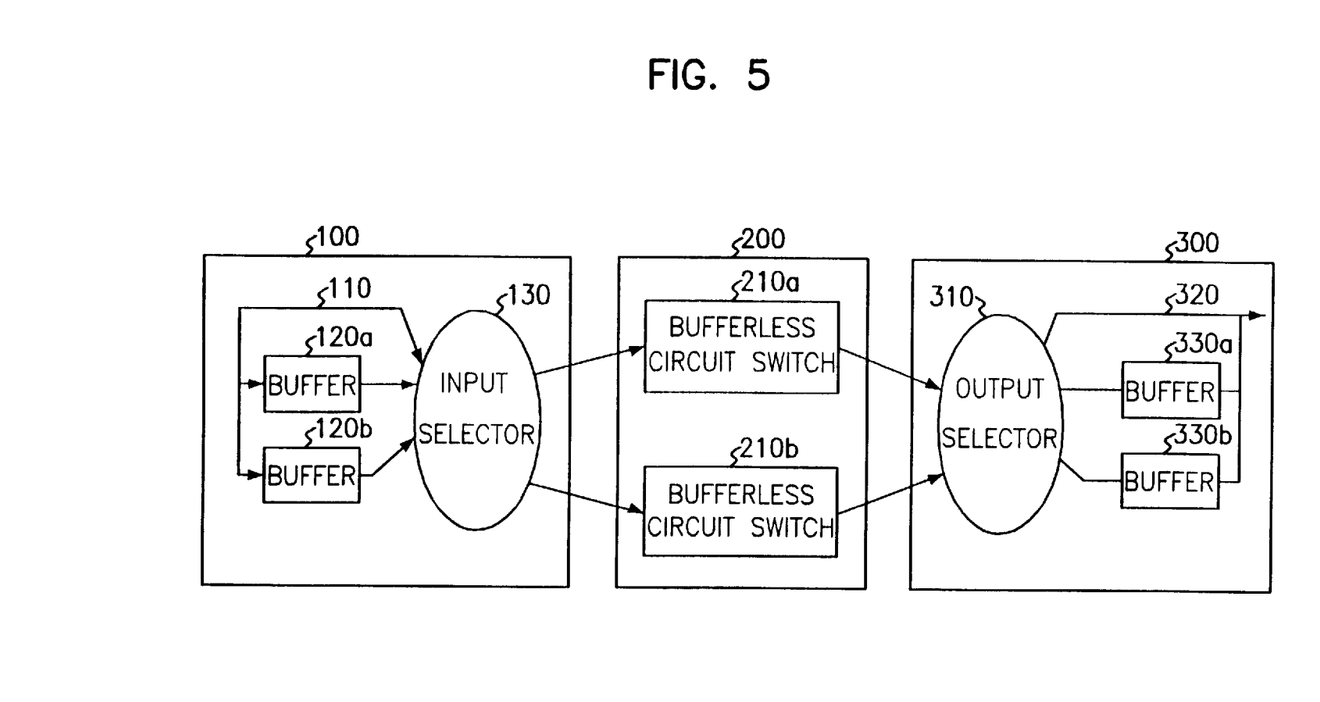
FIG. 5 is a detail block diagram of FIG. 4.

FIG. 5 is a block diagram of the data switching device in accordance with the present invention. The switch part 200 in FIG. 4 includes the parallel connected circuit switches 210a and 210b. The input part 100 have a directive path 110 for the circuit mode service, a duplex input buffers 120a and 120b storing the frame of the frame mode, and an input selector 130 for selecting one of the circuit switches 210a and 210b. The output part 300 have a path 320 for the circuit mode service, output buffers 330a and 330b for storing the frame of the frame mode, and an output selector 310 for selecting one of the circuit switches 210a and 210b.

Figure 6:
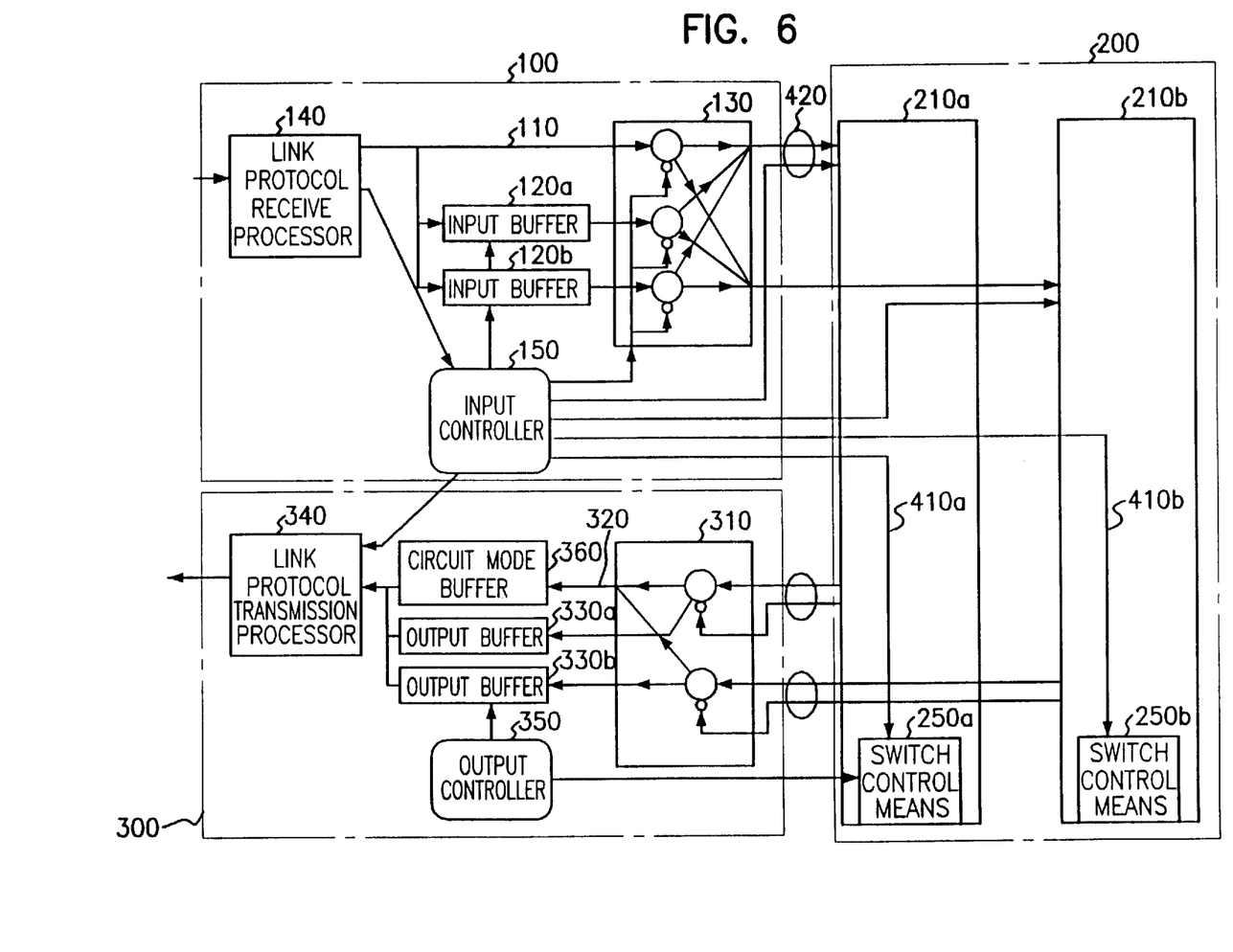
FIG. 6 is a detail block diagram of the I/O part in accordance with the present invention.

FIG. 6 is a detailed block diagram of the I/O part 100 and 300 which is shown in FIG. 4. The input part 100 includes a link protocol receive processor 140, a path 110 for the circuit mode frame, a dual input buffers 120a and 120b storing the frame of the frame mode; an input selector 240 for selective connecting the input frame to the two circuit switch 210a and 210b, and input controller 150 performing the adapted process function in accordance with the kind of the input frame.

The output part 300 includes an output selector 310 connecting the frame which is transmitted through the switch to the relevant output buffers 330a and 330b in accordance with the kind of the service of the frame, an output controller 350 performing the output control as well as output buffer control, one of the output buffers 330a and 330b storing the frame of the frame mode, a circuit mode buffer 360 mounting on the circuit mode path in order to support the intermix mode, and a link protocol transmission processor 340 performing the transmission of the link protocol.

The frame, which is inputted through the transmission link, is inputted to the link protocol receive processor 140. The link protocol processor 210 is a means for processing the transmission protocol in order to perform the point-to-point communication. In the FCS protocol, the link protocol processor 210 has the function of a FC-0 and FC-1 level. This function performs the converting function to the transmission medium signal and the 8B/10B encoding/decoding function. These functions can be performed by a commercial chip (for example, S2039 and S2040 manufactured by AMCC Co. in U.S. and GA9101, GA9102 and GA9103 manufactured by TriQuint Co. in U.S., and data link)

If the received packet is a circuit connection request packet of a circuit mode service, and the destination output doesn't have the other circuit mode connection, then the connection to be output port is established by the output selector 310 through either of the circuit switch 210a and 210b. If the connection is established, the subsequent received circuit mode frames are delivered through the connected line.

If the received frame is a frame of the frame mode, the frame is stored in the input buffers 120a and 120b, and the adequate circuit switch is selected by the input selector 130. At this time, even if the circuit connection is set in the relevant input port or the destination output port, the packet can be transmitted to the destination output buffers 330a and 330b. If it is detected that there is no frame of the circuit mode being transmitted, when the circuit connection is established to a destination port, then the frame of the frame mode is transmitted. At this time, the circuit mode frame can be transmitted during transmission of the frame of the frame mode. In this case, the circuit mode buffer 360 is mounted such that the circuit mode frame can be delayed until the all frame of the frame mode is sent.

Figure 7A:
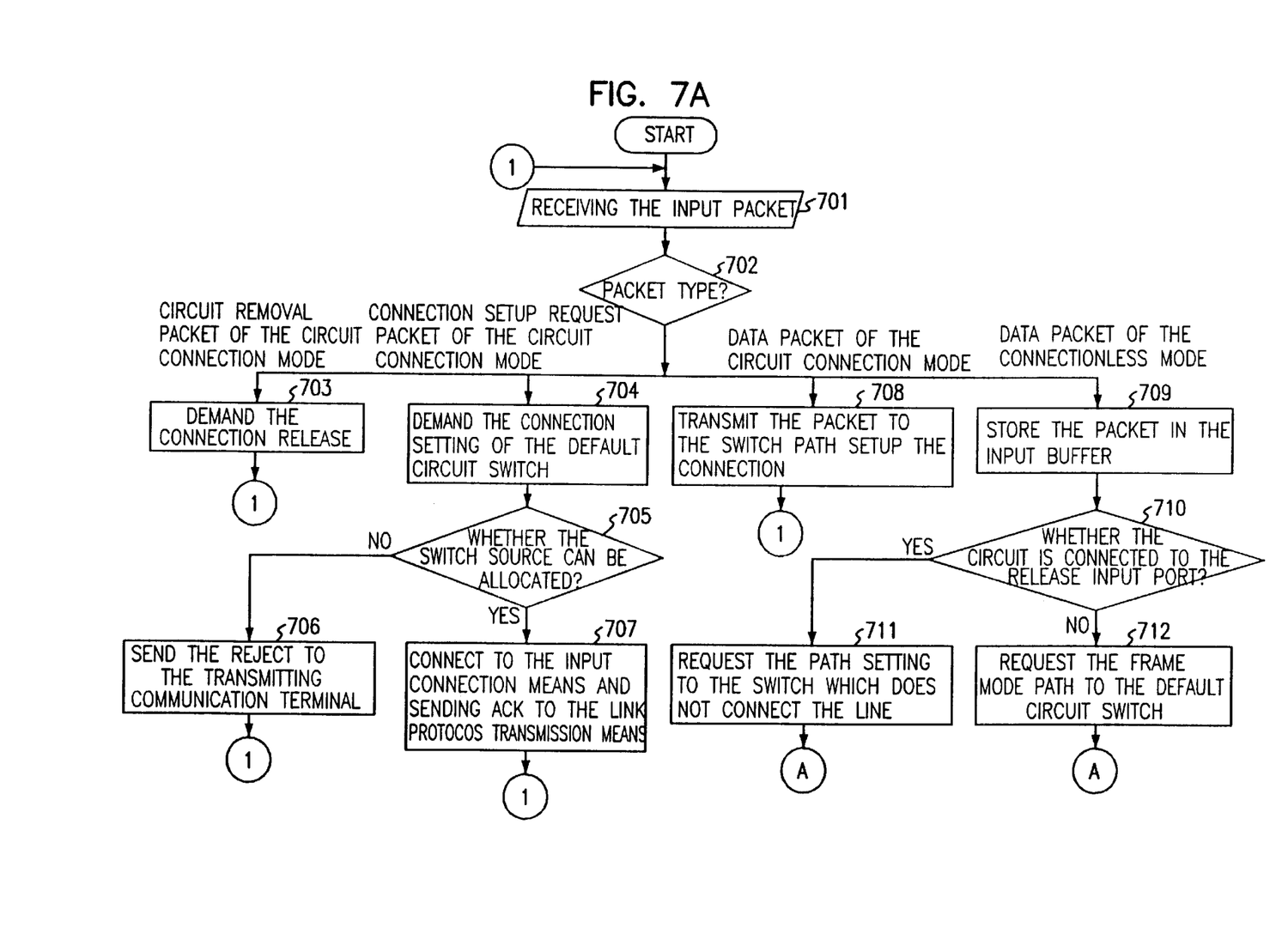
FIGS. 7A and 7B are flow charts of the input frame processing procedure of the controller in accordance with the present invention.
Figure 7B:
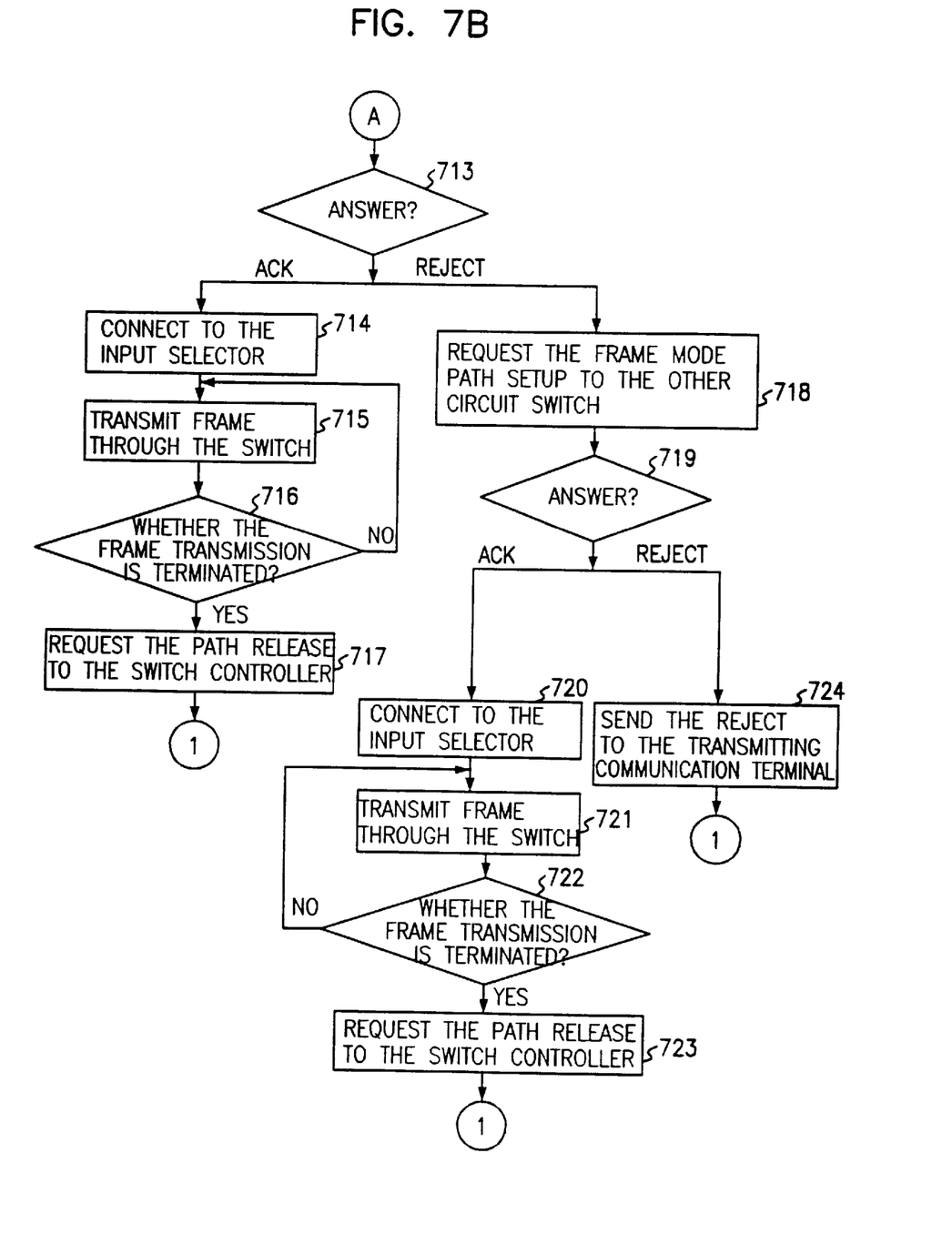

FIG. 7 is a flow chart of the input frame processing procedure of the controller which is showed in FIG. 6. By using the parallel circuit switches 210a and 210b and the dual input buffers 120a and 120b of the input part 100, the input frame is processed in the input controller.

If the transmitted input frame is received in the link protocol received processor 140 through the transmission link 701, the kind of the frame is distinguished by the specially encoded characters of the frame 702 (for example, FCS has a order set).

If the received frame is a circuit connection request frame, the connection set-up is requested to the switch controller 250a of the determined switch plane (for example, circuit switch 210a) in the input controller 150. At this time, the connection set-up request is transmitted through the communication channel 410a and 410b of the switch controllers 350a and 250b and a plurally input part 100, comprising the address information of the destination output port and the originating input port. If the switch controller 250a decides that the switch path resource can be allocated 705, the circuit mode path 110 of the input selector 130 and the input 420 of the relevant circuit switch 210a is selectively connected. And then the connection completion acknowledgment (ACK) is sent 707 to the originating communication terminals through the link protocol transmission processor 340.

Meanwhile, if the switch controller 250a decides that the switch resource can not be allocated, the circuit connection rejection acknowledgment is sent 706 to the originating communication terminals. If the circuit mode frame is received after establishing of the circuit connection in accordance with the above mentioned procedure, the frame is sent through the path of the switch 210a which is set the connection.

If the received frame is a frame of the frame mode, the frame is stored 709 in the input buffers 120a and 120b. In accordance with the present invention, since the input part have two input buffers 120a and 120b, in case that the set-up of the frame path for the one buffer is delayed by the collision of the output port or the switch path, the frame of the other buffer can be transmitted through the other switch.

The various methods for storing the input frame into the input buffer are used. That is, the method for storing to the second buffer 120b, if the next frame is received when the first input buffer 120a requests to the establishment of the connection, the two methods are generally used. One is the method for alternatively storing to the both buffers 120a and 120b regarding to the frame of the frame mode. And the other is the method for storing the frame transmitted to the same destination into the same buffer in accordance with checking the destination address.

If the frame of the frame mode is stored into the input buffers 120a and 120b, in case that the circuit does not connect to the relevant output port, firstly, the frame path set-up is requested to the switch controller 250*a*, that connects with the default circuit switch 210*a*. If the acknowledgment regarding to the request of the frame path set-up is a path set-up completion acknowledgement (ACK) 713, the connection of the input selector 130 is controlled 714, and the frame is sent 715 through the switch 210*a*. If the frame transmission is terminated, the switch controller 250*a* requests the path release 717.

Meanwhile, if the acknowledgment regarding to the frame path setup request is rejected the frame path setting 718, the frame mode path setup is requested to the other switch 210*b*. If the acknowledgment is a path setup completion acknowledgment (ACK) 719, the connection of the input selector 130 is controlled 720, and the frame is sent equally to the frame sending procedure 721. If the frame sending is terminated 722, the input controller requests the path release 723 to the switch controller 250. If the acknowledgment regarding to the frame path setup request is rejected the frame path setup 719, the rejection acknowledgment is sent to the originating communication terminals 724.

If the frame requested the circuit connection release is received after the circuit connection is established, the connection release is requested to the switch controllers 250*a* and 250*b*.

Figure 8:
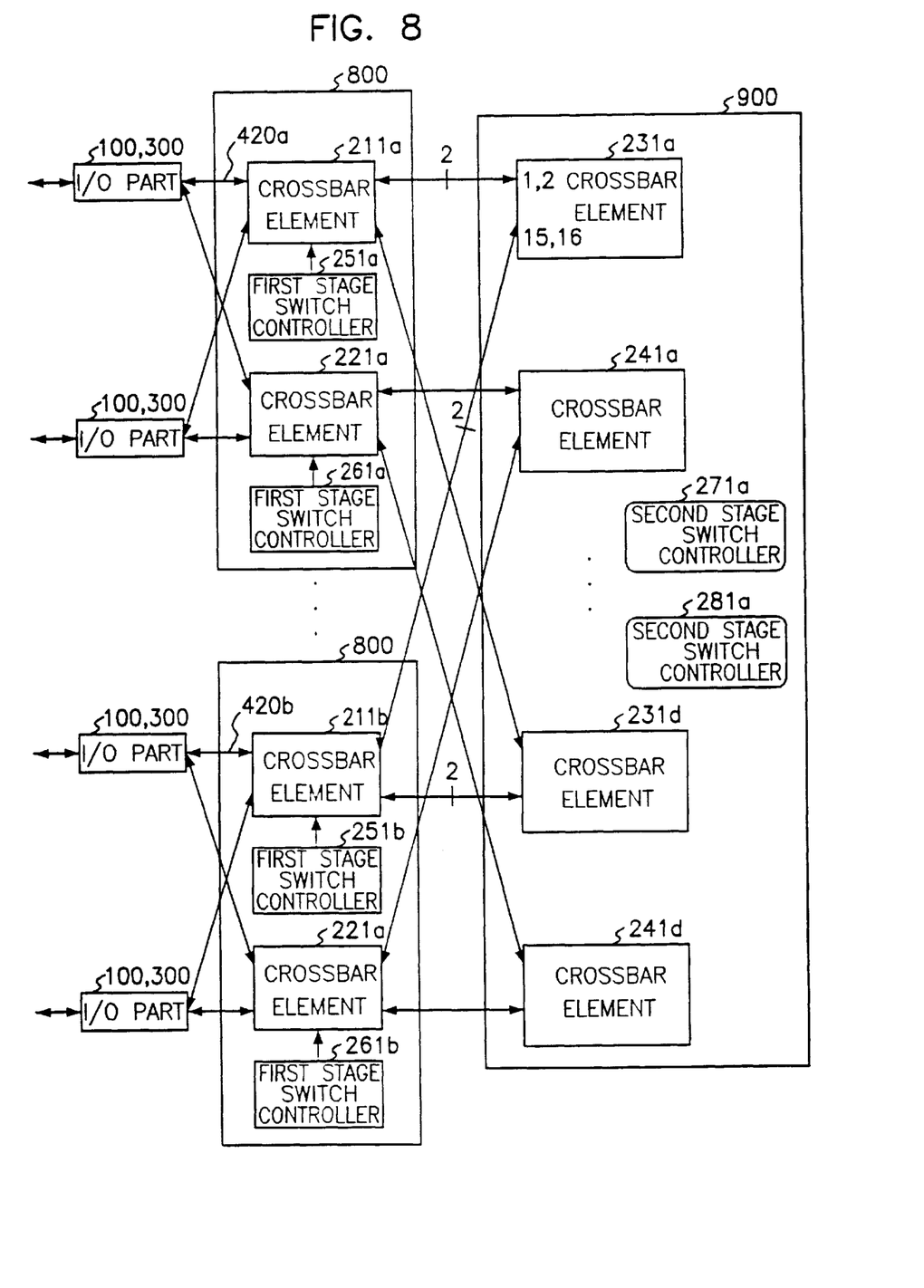
FIG. 8 is a detail block diagram of the switch part which is shown in FIG. 4.

FIG. 8 is a detailed block diagram of the multi-staged switches which are shown in FIG. 4.

A switch parts 210*a* and 210*b* comprise the switching element 211, 221, 231, and 241 providing the physical data path, and switch controllers 251, 261, 271, and 281 controlling the switching element.

The switches 210*a* and 210*b*, in accordance with the present invention, is a bufferless switch, and can be embodied by the cross-bar element. However, the more the number of the ports is increasing, the more the complexity of the cross-bar is geometically increasing are connected with one another. Therefore, the unit cross-bar element 211, 221, 231, and 241 by multi-staged arrangement.

The multi-staged structure method may be able to construct the various topology. However, in the preferred embodiment of the present invention, each unit cross-bar element is formed by two-staged folded structure which provides the path of the bidirection. In this structure, the first-stage unit cross-bar elements 211 and 221 have a mutual exchanging function locally.

In FIG. 8, the first-stage unit cross-bar elements 211 and 221 have bidirection 16 ports. The 8 ports are connected with the local I/O part 100 and 300, the other 8 ports are connected with the 4 second-stage cross-bar elements 231 and 241 which provide the 16 bidirectional port, two by two. Since the eight unit board 800, which includes the eight I/O part 100 and 300 and the first-stage unit cross-bar element 211 and 221, has the total capacitance is 64 ports.

Figure 9:
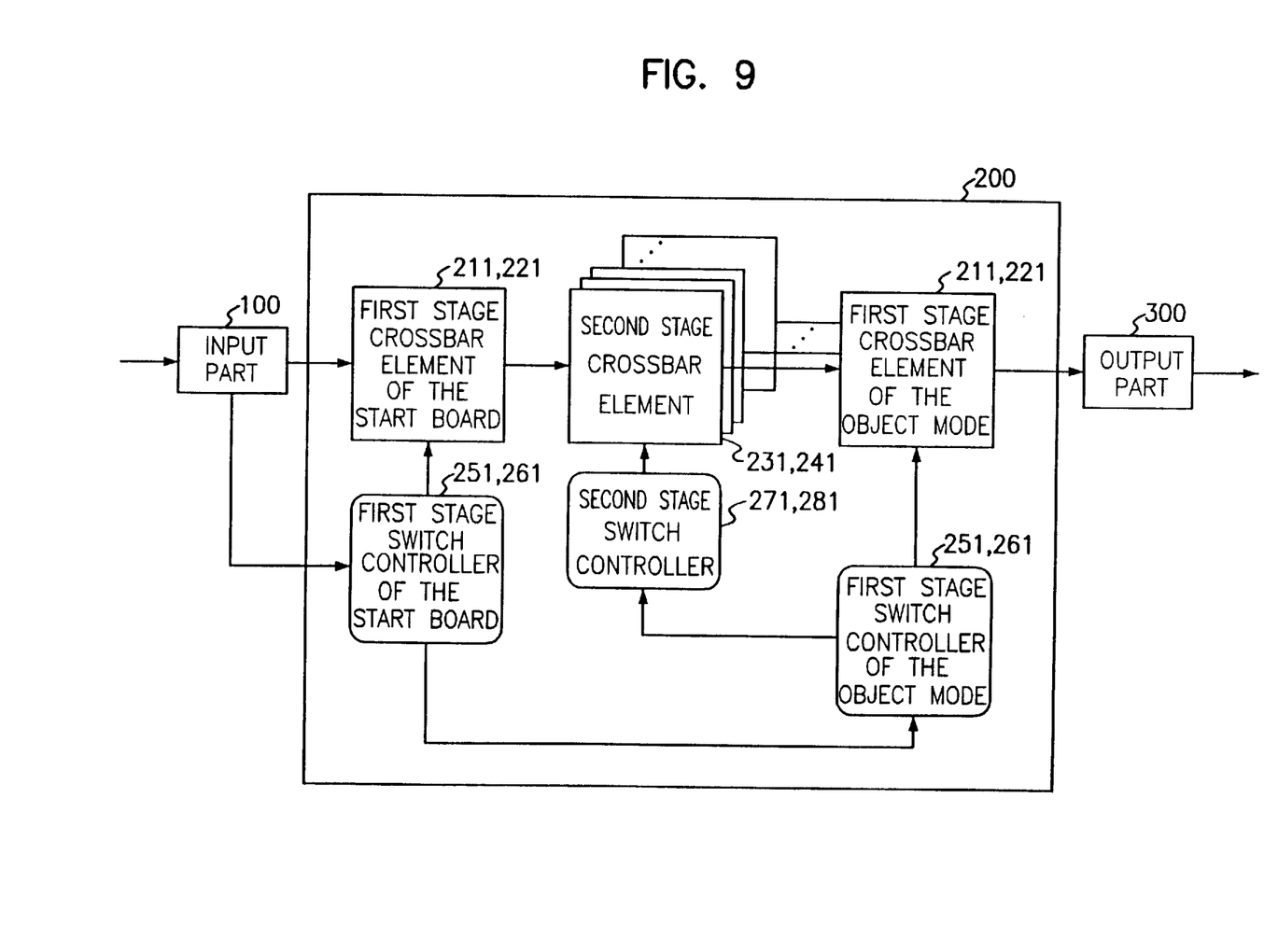
FIG. 9 is a diagram of the switch controller in accordance with the present invention.

FIG. 9 is a diagram for explaining the switch control means in accordance with the present invention.

In the two-staged folded structure having the local exchange function equal to the embodiment of FIG. 8, the switch control function of this invention consists of the first-stage switch controllerss 251 and 261, and second-stage switch controllers 271 and 281. The second-stage switch controllers 271 and 281 does not decide the switch path setup for itself and has characteristics in that it has the function of the passive controlling only the second-stage cross-bar elements 231 and 241 in accordance with the path decision of the first-stage switch controllers 251 and 261 for the board 800 of the destination output port. This structure have a control right relative to the path setup for the output path of the its board 800 in the first-stage cross-bar switch controllers 251 and 261. Therefore, in second-stage cross-bar switch controllers 271 and 281, since the output path of the said board 800 which is distributed to the several second-stage cross-bar 231 and 241, is passively controlled in accordance with the command of the first-stage switch controllers 251 and 261 for the relevant board, the path can be setup by only the one steup procedure of the switch controllers 251 and 261 of the destination board and starting board in the path setup procedure between the unit boards.

If the input controller 150 of the input part 100 requests the path setup of the frame mode data or the circuit mode connection to the first-stage switch controllers 251 and 261, they checked the destination address. If the destination address is equal to the output port address in the board 800 having the starting port, only the control regarding to the path of the first-stage switch elements 211 and 221 in the its board 800 is performed. If the destination port is in another board 800, the input port controller requests the path setup to the switch controllers 251 and 261 of the board 800 in the destination port along with the information about the available output port of the starting port.

Since the various path is exiting between the two local boards 800 having respectively the starting point and the destination, the switch controller decides the available resources together with the available path information of the starting part which is transmitted from the destination. If the switching path resource can be allocated, the path is setup by transmitting the relevant path setting command to the second-stage switch controllers 271 and 281, and the path setup completion acknowledgment is sent along with the path information to the switch controllerss 251 and 261 of the relevant starting board.

Even if the circuit connection exists in the relevant input port and the destination port, since the frame is transmitted to the output part through the dual circuit switch path, the intermix mode service is processed in the output and then the effective intermix mode service can be processed. Also, since the same circuit switch is dually used, the reliability regarding the switch failure can be obtained.

Since the two input buffers are mounted, the subsequent frame can request to the path setup, even if a output collision is occurred in a previous frame. Since the path setup can be requested through the other switch path, the frame is effectively processed, even if the the leading frame occupy the one switch input in order to wait for the path setup acknowledgment. Specially, this structure is better than the switch structure in which the average delay character has the single input buffer, and this performance is similar to the pure output buffer switch.

Meanwhile the switch structure which does not collide internally, is embodied such that the structure is satisfied to the non-collision condition by using the parallel switch having the collision rather than by using the single switch, thereby having the above mentioned advantages.

In the switch having the two stage folded registration structure, the first-stage switch controller have only the control right about the output path of the relevant board of the second-stage switch element path, and the second-stage switch controller perform only the passively switch element control. Since setting procedure of the switch path performs to only the one stage procedure between the switch controller of the starting and destination board, the path setting time becomes short.

What is claimed is:

1. A data switching device for connecting between a plurality of communication terminals, comprising:

an input means comprising a directive data input path having no buffer, the directive data input path for transmitting circuit mode service data received from an outer part;

two parallel input buffers which store frame mode service data received from the outer part;

an input selector which selects output data from said two parallel input buffers and an input path of the circuit mode service data;

a switch means comprising two identical bufferless circuit switches which are connected in accordance with the choice of said input selector;

an output means including an output selector which selects an output path by the output of the switch means;

a directive data output path having no buffer, the directive data output path for transmitting the circuit mode data to the outer part; and two parallel output buffers which store the frame mode service data and the output of said switch means.

2. A device as claimed in claim 1, wherein said input means further comprises:

an input controller which controls the operation of said input selector and the input buffers; and a link protocol receiving processor performing a receiving process function of a transmission protocol which transmits frame mode service data inputted from the outer part to said two parallel input buffers or the directive data input path having no buffer.

3. A device as claimed in claim 1, wherein said output means further comprises:

an output controller which controls the operation of the output selector and said output buffers; and a link protocol transmission processor performing a sending process function of a transmission protocol which transmits the output of the two parallel output buffers or said directive data output path having no buffer to the outer part.

4. A device as claimed in claim 1, wherein the bufferless circuit switches are structured by the mutual connection of the unit switch element formed in a multi staged arrangement.

5. A device as claimed in claim 1, wherein said switch means further comprises switch control means for checking a destination address.

6. A device as claimed in claim 5, wherein the switch control means is structured such that a second-stage switch controller passively controls second-stage switch elements in accordance with a path decision of first-stage switch controllers of a destination output port board.

7. A device as claimed in claim 2, wherein the frame mode service data which is received through the link protocol receiving processor is alternatively stored into the input buffers.

8. A device as claimed in claim 2, wherein the frame mode service data having the identical destination address received through the link protocol receiving processor are stored in a same input buffer.

* * * * *